Sept. 19, 1944.  F. H. BULLER ET AL  2,358,621

WIRING SCHEME FOR OIL-FILLED RELAY SYSTEMS

Filed Sept. 1, 1942

Inventors:
Francis H. Buller,
Stephen Zysk,
Alfred R. Lee,
by Harry E. Dunham
Their Attorney.

Patented Sept. 19, 1944

2,358,621

UNITED STATES PATENT OFFICE 2,358,621

WIRING SCHEME FOR OIL-FILLED RELAY SYSTEMS

Francis H. Buller, Schenectady, N. Y., Stephen Zysk, East Lansdowne, Pa., and Alfred R. Lee, Schenectady, N. Y., assignors to General Electric Company, a corporation of New York Application September 1, 1942, Serial No. 456,946

8 Claims. (Cl. 177—311)

Our invention relates to relay systems, one application of which is in connection with fluid-filled cable installations for transmitting electric current wherein it is important to cause a signal to be given at some remote point in the event of an unwarranted increase or decrease in the pressure of the fluid in the cable due to damage to the cable or failure of operation of the cable auxiliaries.

The object of our invention is the provision of a new and improved relay system adapted for use in connection with fluid-filled cable installations, which is reliable in operation and which is of simplified construction so that it may be installed at relatively low cost.

Figure 1:
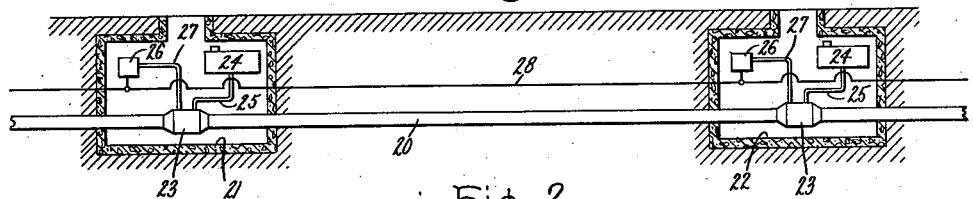
Figure 2:
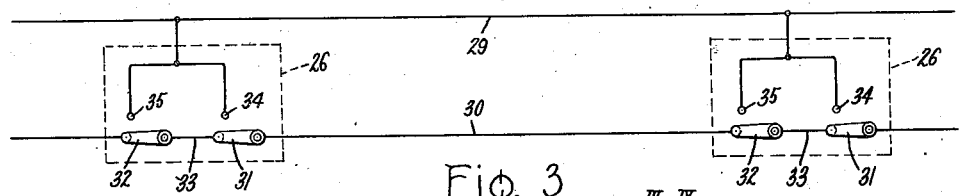
Figure 3:
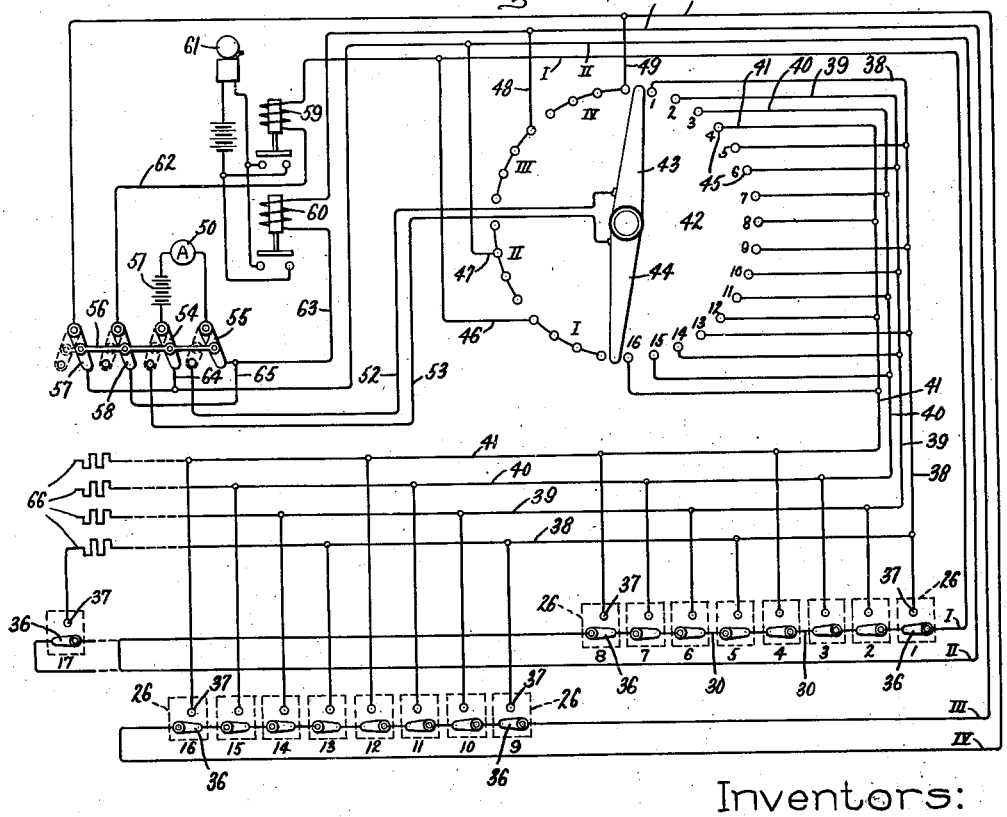

In the accompanying drawing, Fig. 1 is a diagrammatic view showing a cable installation provided with our relay system; Fig. 2 is a diagrammatic view of the pressure responsive device used with our relay system, and Fig. 3 is a wiring diagram of our relay system showing the manner in which it is installed in the cable system.

Fluid-filled cable installations of oil-filled or gas-filled cable have been used to a considerable extent to transmit large blocks of power. Such installations are usually underground in cities where large blocks of power are needed. The cable is installed section by section in ducts between manholes, the number of manholes depending upon the length of the line and the topography of the country. Appropriate joints are usually made between the sections of cable in each manhole and certain manholes are used to house the pressure reservoirs for feeding oil or gas to the cable, as the case may be. The fluid pressure of the cable systems is taken advantage of to operate a supervisory or indicating system to give an indication of the condition of the cable. To this end, relays are installed in certain manholes which are responsive to the fluid pressure in the cable and which are electrically connected to an alarm device in the sub-station or other point at which it is desired to obtain a signal. Should the fluid pressure rise or fall beyond predetermined limits, due to failure of or damage to the cable or auxiliaries, the nearest relay will be operated to give an indication in the sub-station. Not only will an indication of failure of the cable be given, but also an indication of the particular relay manhole nearest to the trouble so that maintenance men may go to the source of trouble without delay.

In one form of such relay system now in use, the pressure responsive relay in the manhole operates a transmitter which, in turn, actuates a recorder at the sub-station through a 3-wire loop circuit. While this system is very reliable in operation, it is relatively expensive due to the additional equipment required in the form of the transmitter and recorder.

Another such relay system employs a 2-wire control cable to which the pressure responsive relays are connected directly in parallel. Into each relay lead is inserted a resistance, which has a different value of resistance for each relay station at the various manholes. At the indicating point, a predetermined voltage is applied to the system through an ammeter which serves as an indicator, so that upon operation of any particular relay the amount of current flowing through the system, depending upon the resistance, will give an indication as to which relay operated. While this system is simple and economical to install it has the disadvantage that accurate indications are difficult to obtain when a large number of relays are employed, say more than 10, because of the large number of resistances required. Moreover, moisture usually present in manholes affects the accuracy of the resistances so that in extreme cases erroneous indications are obtained.

A third system presently employed is to attach pilot wires to each relay and run them to the indicating station. While this arrangement is positive in operation it requires a large number of wires if the relay stations are numerous since the number of wires varies directly as the number of relays. This means that the control cable, into which the wires are assembled, becomes too large and bulky to be handled conveniently so that the cost becomes excessive.

Our new and improved relay system, on the other hand, is so designed and constructed that a positive indication is obtained at all times and the number of wires in the control cable has been considerably reduced making it possible to install the system at low cost. At the same time, our system is one which is adapted for use with a large number of relay stations without a corresponding increase in the size and cost of the control cable. The system is connected directly to the pressure operated relays obviating the need for special transmitter equipment.

Referring to the drawing, we have illustrated diagrammatically in Fig. 1 a fluid filled cable installation which includes a cable 20, of either the oil filled or gas filled type, a section of which extends between spaced manholes 21 and 22. Other sections of the cable are spliced to it by joints 23 located in the respective manholes. A reservoir 24 is connected to each joint by a pipe line 25 to supply fluid to the cable and to maintain it under positive predetermined pressure. A device or relay 26 is likewise connected to the joint through a pipe line 27 so that it may be operated by fluctuations of the fluid pressure within the cable. A control cable 28 interconnects the relays and extends to the sub-station or other point at which an indication is desired.

The relays 26 may be of any suitable type responsive to a condition of the fluid insulation in the cable, for example we often employ a pressure actuated switch or relay of the type described in Patent No. 2,275,866 issued to Lewis R. Runaldue on March 10, 1942, and assigned to the same assignee as the instant application. Such a relay and the manner in which it is connected to the control cable is illustrated diagrammatically by Fig. 2. Each relay is connected across conductors 29 and 30 of the control cable and each is provided with two switches 31 and 32, one of which is responsive to a predetermined high pressure of the fluid in the cable, while the other is responsive to a predetermined low pressure. The mechanism for operating the switches forms no part of the present invention and hence has not been illustrated, but such an arrangement is fully illustrated and described in the aforementioned Runaldue Patent 2,275,866. The individual switches of each relay are electrically connected together in series, when the switches are in normal position, by a conductor 33. Cooperating with the switches 31 and 32 are fixed contacts 34 and 35, respectively, connected to the conductor 29. The arrangement described gives each switch two positions of operation, one in which the switches are normally maintained connected in series, as shown by Fig. 2, the other in which either one of the switches is moved into engagement with its corresponding fixed contact connected to conductor 29. When this occurs, an alarm is transmitted to the indicating station through the conductors 29 and 30 and the closed switch. The mechanism by which it is determined which one of the relays has operated will now be described with particular reference to Fig. 3.

In the showing of Fig. 3, the relays 26 have been illustrated diagrammatically and have been numbered 1, 2, 3, etc., up to 16 which corresponds to the number of manholes incorporated in the particular cable installation being described, by way of example. However, as will be pointed out later, the number of relay stations may be increased or decreased at will with only a slight adjustment of the relay system. For the sake of simplicity, the two switches in each relay have been shown as a single switch 36 cooperating with a fixed contact 37, it being understood, however, that when either the high pressure or low pressure switch in the actual relay is operated that the switch 36 engages contact 37, in the showing of Fig. 3. All the movable switch arms of the relays are electrically interconnected in series by the conductor 30.

Referring to the lower portion of Fig. 3, it will be seen that the switch arms 36 of relays 1 to 4, inclusive, are connected together in series so that upon operation they rotate in a clockwise direction so that, in effect, current is supplied to them through an operating wire I. On the other hand, the switch arms of the next succeeding set of relays 5 to 8, inclusive, are connected to rotate in a counterclockwise direction so that, in effect, current is supplied to them through an operating wire II. From another viewpoint, the movable members of the switches 1 to 4 are directly connected to the wire I and indirectly through their cooperating contacts to the wire II, whereas the movable members of the switches 5 to 8 are directly connected to the wire II and indirectly to the wire I. In a similar manner, the switches of relays 9 to 12, inclusive, rotate in a clockwise direction and are fed by a wire III while the switches of relays 13 to 16, inclusive, rotate in a counterclockwise direction and are fed by a wire IV. It will thus be seen that the relays are arranged in sets of four.

Cooperating with each set of relays are four locating wires designated 38, 39, 40 and 41 to which the respective fixed contacts 37 of the relays are connected and which correspond to the wire 29 of Fig. 2. The fixed contact of relay 1 is connected to wire 38, that of relay 2 to wire 39, that of relay 3 to wire 40 and that of relay 4 to wire 41. The fixed contacts of the next set of relays 5 to 8, inclusive, are similarly connected to the locating wires in order, that of relay 5 to wire 38, relay 6 to wire 39, etc. In this manner, all the relays are connected to the four locating wires in sets of four, as shown by Fig. 3. The locating wires 38 to 41, inclusive, and the operating wires I to IV, inclusive, are all connected to an indicating system at the substation.

The indicating or locating system includes a scanning dial 42 having a manually rotating pointer made up of conducting portions or contacts 43 and 44 insulated from each other and adapted to cooperate with a plurality of contacts arranged around the perimeter of the dial. On one half of the dial spaced contacts 45 are arranged, the number of contacts depending on the number of relays in the system, in this case 16. The contacts have been identified as 1 to 16, inclusive, to correspond to the numbering of the relays. They cooperate with the movable contact 43 of the pointer. The individual contacts 45, in groups of four, are connected to the four locating wires 38, 39, 40 and 41 the same as the corresponding relays. For example, contact 1 is connected to wire 38, contact 2 to wire 39, contact 3 to wire 40 and contact 4 to wire 41; the arrangement is then repeated, contact 5 to wire 38, contact 6 to wire 39, etc., so that all of the contacts are connected in order corresponding to the arrangement of the relays. On the other half of the dial a corresponding number of contacts are arranged diametrically opposite the contacts 45, but these contacts are electrically connected together in series in groups of four to form conducting segments or contact arcs which are engaged by the movable contact 44 of the pointer. The segments are identified as I, II, III and IV to correspond with the numbering of the operating or indicating wires I, II, III and IV to which they are connected by conductors 46, 47, 48 and 49, respectively.

The indicating or locating system also includes an ammeter 50 and a current source, such as a battery 51, adapted to be connected to conducting wires 52 and 53 leading to the pointer of the scanning dial by movable blades 54 and 55 forming part of a four pole switch 56. The switch is provided with two additional blades 57 and 58 connected into the circuit for a purpose to be described presently. Two relays 59 and 60 are provided, each of which operates an alarm circuit including a bell 61 connected to the contacts of the relays in a well known manner. The relay 59 is connected to the operating wire I and also by a conductor 62 to the switch blade 58. Relay 60 is connected to operating wire III and by a conductor 63 to a contact cooperating with switch blade 55 when the latter is in normal operating position. The operating wire IV is connected to switch blade 57 while the operating wire II is connected to a fixed contact of the switch for cooperation with blade 57 and by a conductor 64 to a fixed contact for cooperation with blade 54. A conductor 65 connects conductor 63 with a fixed contact for cooperation with switch blade 58. The switch 56 is shown by Fig. 3 to be in normally closed operating position and the manner in which the alarm system functions upon operation of a relay will now be described.

With switch 36 in the position shown, current flows from one side of battery 51, through switch blade 54, conductor 64, operating wire II to relay 8, thence through the normally closed switches of the relays to operating wire I, to relay 59, conductor 62, switch blade 58, conductor 65, switch blade 55, ammeter 50 to the other side of the battery. Simultaneously, the current flow branches from conductor 64 to switch blade 57, operating wire IV to relay 16, thence through the normally closed switches of relays 16 to 9, inclusive, to operating wire III to relay 60, conductor 63, switch blade 55, ammeter 50 to the battery. In this manner the relays 1 to 16 will be energized at all times. Should one of the relays be operated by unusual pressure conditions within the cable, the movable contact 36 of the relay will be moved clockwise or counterclockwise, as the case may be, to open one or the other of the operating circuits just described causing the corresponding relay 59 or 60 to drop out actuating the alarm 61.

Let it be assumed that the relay 8 is actuated by a pressure condition in the cable so that the movable contact 36 moves counterclockwise into engagement with the fixed contact 37 connecting the relay to the locating wire 41. As soon as the series circuit through the relay switches and the wires I and II is interrupted, the relay 59 drops out actuating the alarm 61. The operator now knows that a fault has occurred in the cable system, but he does not yet know at what point along the line the fault has occurred. In order to ascertain this fact, he must determine which relay sent in the alarm. To do this, the operator simply manipulates the scanning dial 42.

When the alarm is given, the operator throws the double pole switch 56 to its other position, i. e., to the left in the showing of Fig. 3, so that the contact blades 54 and 55 make electrical connections with the conductors 52 and 53, as shown in dotted lines, thereby energizing the contact arms 43 and 44 of the pointer from the battery 51. The operator now rotates the pointer so that the contact arms 43 and 44 pass over the contacts on the perimeter of the dial until a circuit is established through the contacts to the relay which has operated. In the supposed case, the pointer is rotated until the arm 43 engages the contact 8. When this occurs, the other conducting arm 44 will have engaged the last contact in the segment II diametrically opposite the contact 8. A circuit is now established to the ammeter 50 in the following manner. Current from one side of battery 51 flows through switch blade 54 to conductor 53 to pointer arm 44, segment II, conductor 47, operating wire II, relay 8, contact 37, locating wire 41, contact 8, conducting arm 43, conductor 52, switch blade 55, ammeter 50 to the other side of the battery. Thus, to obtain a reading, it is only necessary for the operator to rotate the pointer to move the contact arms 43 and 44 across the dial until the ammeter 50 operates. The position of the pointer will then indicate which relay has operated since only in one position of the pointer will a circuit be closed to the ammeter. Upon operation of any one of the relays 1 to 16, inclusive, the circuit through them is the same as that just described so that it is believed unnecessary to trace the circuit for operation of each individual relay. This may be easily done for any particular relay by reference to Fig. 3.

Our relay system is one which is of simple construction and which is entirely fool-proof inasmuch as a positive indication is given as to the location of any fault in the cable system. The construction is relatively inexpensive since a large number of relay stations may be hooked up to a control cable having relatively few conductors. In the instant case, 16 relay stations are connected into an alarm system by means of an eight-conductor control cable. This considerably reduces the cost of the installation.

It will be apparent that the system may be extended if more than 16 relay stations are being used simply by increasing the number of locating and operating wires. However, the system may be more economically extended by inserting suitable resistors 66 in the locating wires 38 to 41, inclusive. Relays are then connected into extensions of the operating wires I to IV, inclusive. To illustrate this modification, we have shown in Fig. 3 an additional relay 17 connected into the relay system by connection to locating wire 38 and operating wires I and II. Relay 17 now operates the alarm system 61 in the manner described so that the operator will move the pointer to a position to indicate that either the relay 1 or the relay 17 operated. However, by reading the amount of current flowing through the circuit on the ammeter 50, the operator can tell at a glance whether it was the relay 17 or 1 because if the relay 17 operates the flow of current is cut down by the resistor 66. In this manner, our system can be extended to include considerably more relay stations than the sixteen mentioned. More than one resistor can be used between corresponding sets of relays. With two resistors in each of the locating lines 38 to 41, a total of 48 relay stations may be hooked into the alarm system without increasing the number of conductors in the control cable. The resistors are so designed as to give definite predetermined values of current flow in the ammeter 50 so that there is no danger of obtaining erroneous readings, as was frequently the case in former systems already mentioned in which a different value resistor was used at each relay station.

Our system has the further advantage that any break in the operating wires I to IV of the control cable will immediately operate the alarm 61 the same as operation of a relay. In such case no circuit can be established through the dial switch and the locating wires as long as all of the switches or relays remain in their normal or operating position shown in Fig. 3. The location of the break in the operating wire, however, can be readily determined by well known methods.

Thus, with our invention we have accomplished an improved arrangement of a supervising and locating system especially adapted for use in connection with fluid-filled cable installations having a plurality of devices such as switches actuated by a condition such as the pressure of the fluid in the cable. Each of the switches has a movable switch member and a first and a second contact or contact means. The first contact is engaged by the switch member during one condition such as during normal pressure condition of the cable fluid and the second contact or contact means is engaged during another condition such as in case the cable fluid pressure deviates a certain amount from the normal fluid pressure. The arrangement for supervising the switches comprises a series circuit connecting at least some of the switches and the first contacts to an electric source and an indicating means such as an alarm arranged to operate upon interruption of said series connection due to a break of the cable or more particularly due to a change in position of one of the switches. The series circuit includes a source of electricity and is normally closed which, as pointed out above, has the advantage that an alarm is given upon break of a wire of the circuit. In a preferred embodiment, as described above, the switches are arranged in groups and a separate series circuit is provided for each group. Each of the groups is divided into sub-groups. In the above example each main group has two sub-groups. Each group is series-connected to the indicating means by two indicating wires I, II and III, IV respectively. Thee movable members of the switches of one sub-group are directly connected to one of the indicating wires I and the movable members of the switches of the other sub-group are directly connected to the other indicating wire II. Thus, the movable members of the switches, whether they engage the first or second contact or contact means associated therewtih, are always connected to one of the indicating wires and the movable switch members of the different sub-groups are connected to different indicating wires. The number of indicating wires I to IV accordingly is equal to the number of sub-groups.

The means for locating a particular switch that has been moved from its normal connection with the first contact into engagement with its second contact comprises in addition to the aforementioned indicating wires a plurality of locating wires 38 to 41 and a selective switching means for establishing circuits through the locating wires and any switch that has been moved out of its operating position. The selective switching means and the locating wires in cooperation with the indicating or series-connecting wires constitute means for selectively locating any switch that has been operated. In case each of the sub-groups has four switches, four locating wires are needed. Generally the number of locating wires is equal to the maximum number of switches of any of the sub-groups. The number of switches for a given number of locating wires may be increased by the provision of resistances connecting some of the switches to the respective locating wires.

What we claim as new and desire to secure by Letters Patent of the United States is:

1. The combination of a plurality of switches each having a movable switch member and a first contact normally engaged by the switch member, and a system for supervising the switches and locating any one of them when disengaged from its first contact, said system comprising a separate locating contact associated with each movable switch member, an electric circuit including a source and a supervising device connecting the switches in series and giving an indication upon disengagement between any movable switch member and the first contact associated therewith, selective switching means having a plurality of contact means each connected to one of said second contacts, other contact means connected to said series circuit, and means associated with said plurality of contact means and said other contact means for selectively establishing an electric circuit through any switch member when engaging its second contact.

2. The combination of a plurality of switches each having first and second contact means and a movable switch member normally engaging the first contact means and forced into engagement with the second contact means upon disengagement from the first contact means, means for supervising the switches comprising a series circuit through the movable switch members and the first contact means including an electric source and first and second indicating wires and a device associated with the circuit for indicating opening of the circuit upon break of a wire and upon disengagement between a switch member and a first contact means associated therewith, and means for locating any switch upon opening of the series circuit, said locating means comprising selective switching means having a set of contacts each connected to one of the second contact means, another set of contacts each connected to an indicating wire, and means for selectively establishing electric circuits through the two sets of contacts and the switch members and the second contact means associated therewith.

3. The combination of a plurality of switches each having first and second contact means and a movable switch member normally engaging the first contact means and engaging the second contact means upon disengagement from the first contact means, means for supervising the switches comprising a series circuit through the movable switch members and the first contact means including an electric source and first and second indicating wires and a device associated with the circuit for indicating opening of the circuit upon disengagement between any switch member and the first contact means associated therewith, and means for locating any switch upon opening of the series circuit, said locating means comprising selective switching means having a first set of contacts each connected to one of the second contact means, a second set of contacts each connected to one of the indicating wires and cooperatively associated with one of the first set of contacts, and means including an electric source to establish an electric circuit through certain contacts of the first and second sets upon disengagement between the switch member and the first contact means of any switch.

4. The combination of a plurality of switches each having a movable switch member and first contact means normally engaged by the switch member, means for indicating disengagement between a switch member and its first contact means comprising two series circuits each having separate indicating wires and being formed through separate groups of said switches and a common electrical source and a device for indicating opening of a series circuit upon disengagement of a switch member and its cooperating first contact means, and means for locating any particular switch member upon disengagement from its first contact means comprising a separate second contact means associated with each movable switch member, selective switching means having a first set of contacts each connected to one of the second contact means of each group and a second set of contacts connected to different indicating wires, and means for selectively establishing electric circuits through the two sets of contacts and the switches.

5. The combination of a plurality of switches each having a movable switch member and a first contact normally engaged by the switch member, means for supervising the engagement between the switch members and the respective first contacts comprising two series circuits each formed through a different group of switches, an electrical source and a device associated with the circuits to indicate opening of one of the circuits upon disengagement between a switch member and its first contact, and means for locating any switch upon disengagement between its movable member and first contact comprising a separate second contact for each switch arranged to be engaged by the switch member upon disengagement between the latter and the respective first contact, a dial switch having a first set of contacts each connected to one of said second contacts and a second set of contacts each connected to one of the series circuits and cooperatively associated with a group of contacts of the first set, and means for selectively establishing electric circuits through the two sets of contacts and for closing such circuits with regard to any switch member when engaging its second contact.

6. The combination of two groups of switches each having a movable switch member and a first contact means normally engaged by the switch member, means for supervising the switches comprising a series circuit for each group connecting the switches of such group in series and including first and second wires and means indicating interruption of one of the series circuits upon disengagement of a switch member and its first contact means, each group of switches forming two sub-groups with the switch members of one sub-group directly connected to one of the wires and indirectly connected through its first contact means to the other wire, and means for locating any switch member when disengaged from its first contact means comprising a separate second contact means associated with each movable switch member, selective switching means having a first set of contacts each connected to one of the second contact means of each group and a second set of contacts connected to different indicating wires, and means for selectively establishing electric circuits through the respective contacts of the first and the second set.

7. The combination of two groups each including two sub-groups of a plurality of switches, each switch having a movable member and first contact means normally engaged by the movable member, means for supervising the switches including separate electric series circuits through each group of switches, each circuit including a first and a second indicating wire, a common electrical source and an indicating device for the series circuits responsive to the opening of any switch, the switch members of one sub-group being directly connected to one indicating wire and the switch members of the other sub-group being directly connected to the other indicating wire of a group, and means for locating any switch upon disengagement between its movable member and its first contact means comprising a separate second contact means associated with each movable switch member, a dial switch having a set of contacts each connected to a second contact means of each sub-group, said dial having a second set of contacts forming contact arcs cooperatively associated with the contacts of the first set and each connected to one of the wires leading to a sub-group, and means for selectively establishing electric circuits through the contacts of the two sets.

8. The combination of a plurality of switches each having a movable switch member and a first contact means normally engaged by the switch member, means for supervising the switches and indicating that one of them has operated comprising a series circuit formed through the switches and including a first and a second indicating wire and an electric source whereby operation of a switch interrupts the series circuit, and means for locating any switch that has operated comprising a separate second contact means associated with each movable switch member, selective switching means having a first set of contacts each connected to a second contact means, some of said contacts being connected to two second contact means with one connection including a resistance associated with one of the second contact means, a second set of contacts associated with said selective switching means with each contact connected to one of the wires, and means including said electrical source for establishing an electric circuit through corresponding contacts of the two sets and said switch members and second contact means.

FRANCIS H. BULLER.
STEPHEN ZYSK.
ALFRED R. LEE.